Figure 1:
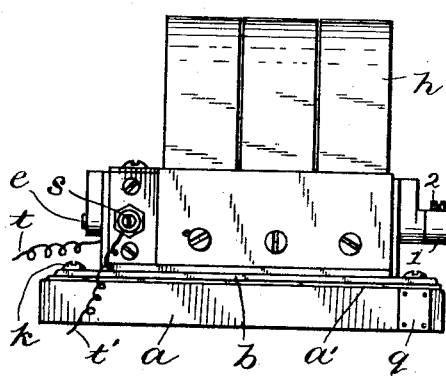

No. 700,491. Patented May 20, 1902.
G. W. HENRICKS.
SAFETY SPEED LIMITING MEANS.
(Application filed Oct. 14, 1901.)
(No Model.) 3 Sheets—Sheet 1.

WITNESSES:
Wm H Payne
L. H. Sickels

INVENTOR:
Garrett W. Henricks,
BY
E. T. Silvius,
ATTORNEY.

THE NORRIS PETERS CO., PHOTO-LITHO., WASHINGTON, D. C.

No. 700,491. Patented May 20, 1902.
G. W. HENRICKS.
SAFETY SPEED LIMITING MEANS.
(Application filed Oct. 14, 1901.)

(No Model.) 3 Sheets—Sheet 2.

WITNESSES:
Wm H Payne
L. H. Sickels

INVENTOR:
Garrett W. Henricks,
BY
E. J. Silvius,
ATTORNEY.

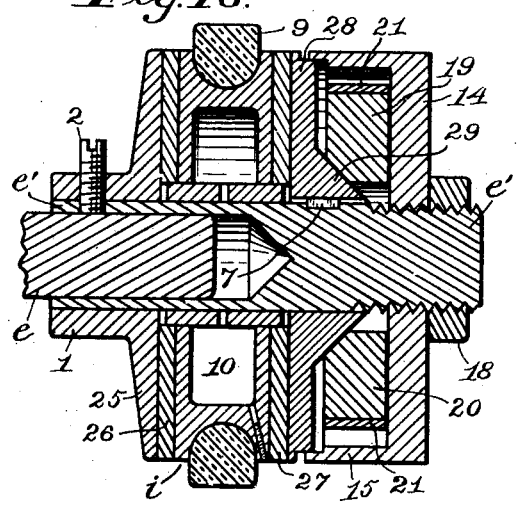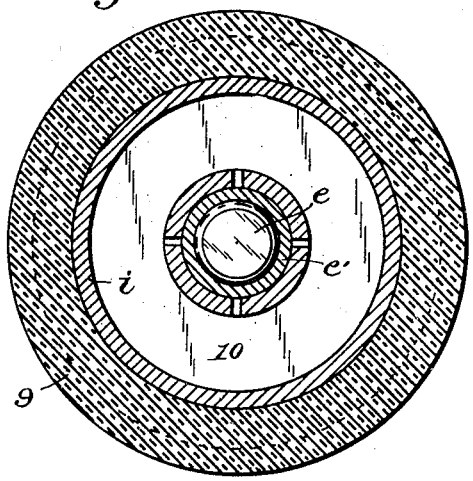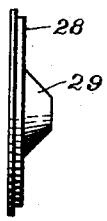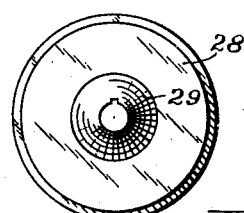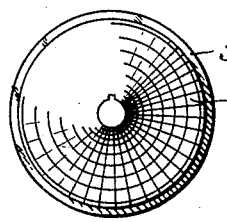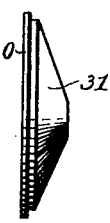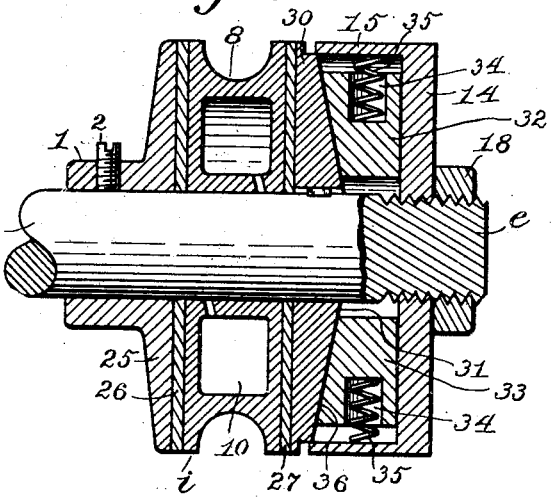

UNITED STATES PATENT OFFICE.

GARRETT W. HENRICKS, OF INDIANAPOLIS, INDIANA, ASSIGNOR TO HENRICKS NOVELTY COMPANY, OF INDIANAPOLIS, INDIANA.

SAFETY SPEED-LIMITING MEANS.

SPECIFICATION forming part of Letters Patent No. 700,491, dated May 20, 1902.

Application filed October 14, 1901. Serial No. 78,547. (No model.)

*To all whom it may concern:*

Be it known that I, GARRETT W. HENRICKS, a citizen of the United States, residing at Indianapolis, in the county of Marion and State of Indiana, have invented certain new and useful Improvements in Safety Speed-Limiting Means; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to mechanism for safely limiting the speed of driven shafts that receive motion from driving-shafts or from wheels thereon which normally run at high velocity, and it has particular reference to small electricity-generating machines that are designed for use in connection with igniters of gas-engines which must be driven immediately upon starting the engine, and as the latter attains its normal high rate of speed the generator must be prevented from acquiring such a high velocity as would be damaging thereto, the object of the invention being to provide improved and simple means for safely protecting the generator from the evils of excessive speed when driven by an abnormally large pulley or wheel, the driven pulley of the generator being necessarily of infinitely small proportions relatively.

A further object is to provide a controller that will not be obstructive in use when the face of the driving-wheel is narrow and the generator-pulley acquiring its motion by direct contact therewith.

Considered broadly, the invention consists in the application to the shaft of a generator of a loose pulley and controlling mechanism including friction faced elements, whereby the pulley may be normally locked to and also released from the shaft, together with novel forms of parts embraced therein and peculiar combination and arrangement of parts; and it consists also in an incased controller disposed contiguous to the pulley and also in bearings for the pulley which are adjustable manually and also automatically for coacting with the wedging elements.

In order to show the peculiar functions of my devices, they are illustrated in connection with a simple form of generator and a gas-engine, and it will be obvious that my invention will be applicable to many or all forms of small generators and other machines.

Specifically, the invention consists in the new and novel parts and in the combination and arrangement of parts, as hereinafter particularly described, and pointed out in the claims.

Figure 2:
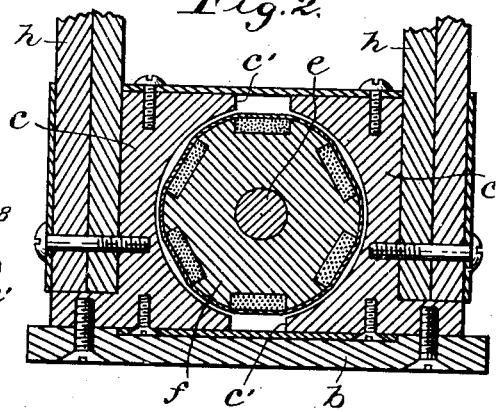
Figure 3:
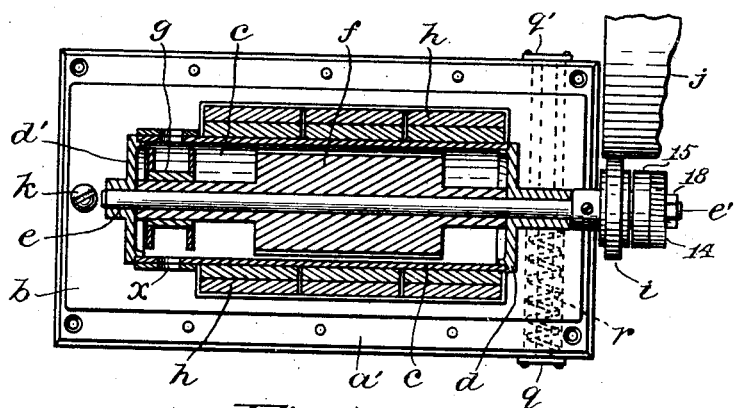
Figure 4:
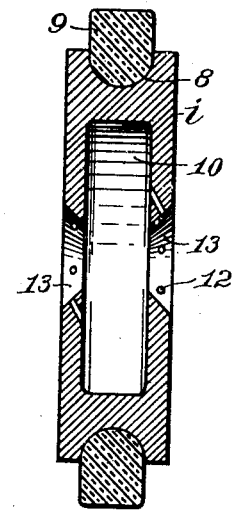
Figure 5:
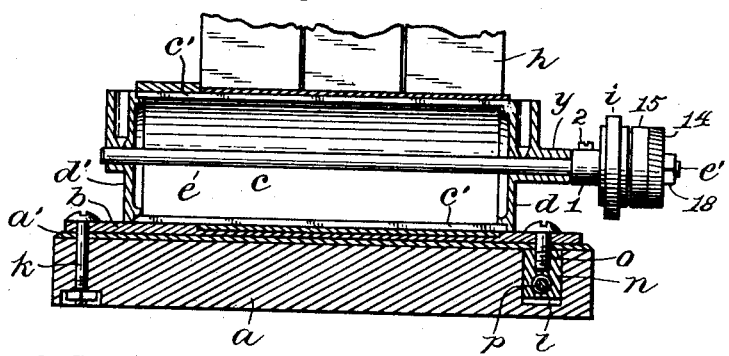
Figure 6:
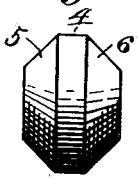
Figure 7:
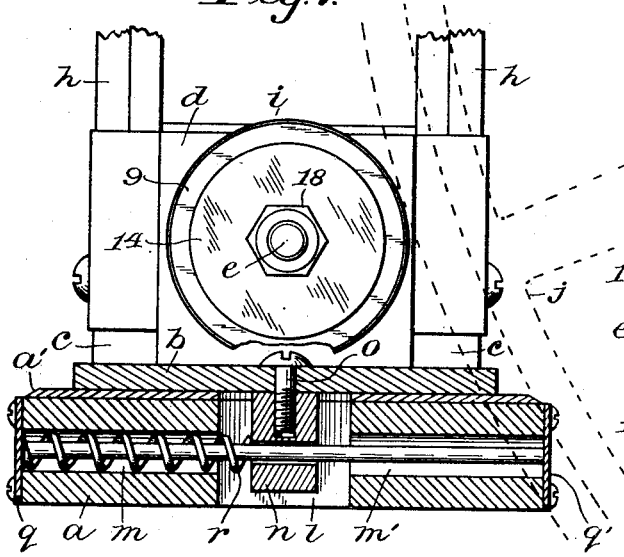
Figure 8:
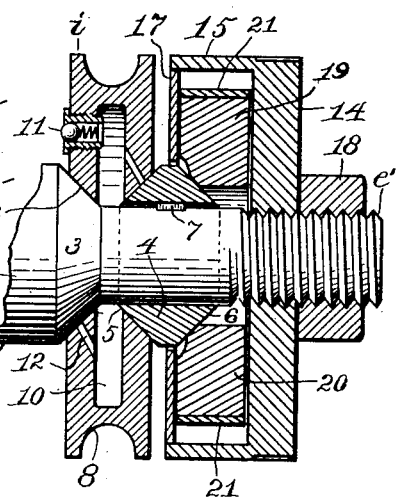
Figure 9:
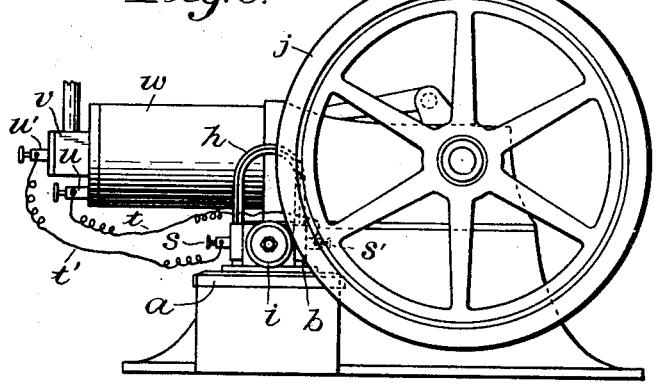
Figure 10:
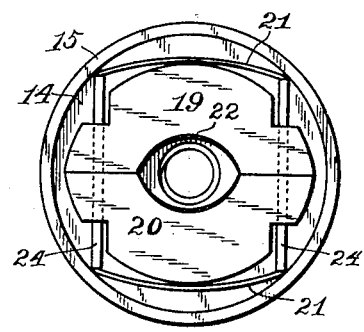
Figure 11:
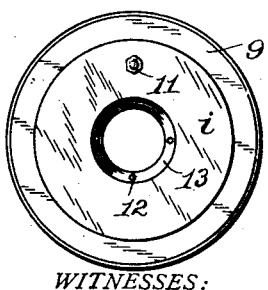
Figure 12:
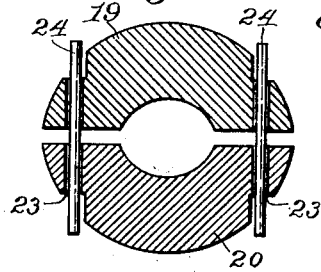
Figures 13, 14, 15:
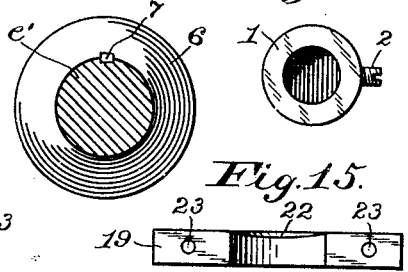

Referring to the drawings, Figure 1 is a side elevation of a generator having my invention applied thereto, by which its compact form will be seen; Fig. 2, a fragmentary transverse vertical sectional view of the generator, showing principal elements thereof; Fig. 3, a horizontal sectional view of the generator, showing my improvements connected therewith; Fig. 4, a central sectional view of the loose pulley as preferably constructed; Fig. 5, a fragmentary vertical longitudinal central sectional view of some principal parts of the generator to which my improvements are applied; Fig. 6, a side view of part of the bearing for the pulley and also forming part of the wedging mechanism; Fig. 7, a fragmentary end elevation of the generator and portions of my improvements connected therewith, portions being in section and showing the cushion for protecting the driven pulley against the thrusts of the driving-wheel when operating in contact; Fig. 8, a central sectional view showing the internal construction of the pulley and the controller as preferably formed; Fig. 9, a side elevation of a gas-engine with which my improved devices are in operative connection; Fig. 10, an inside plan view of the controller-casing and adjustable support, in which parts of the wedging mechanism are shown; Fig. 11, a rear plan view of the pulley as preferably formed; Fig. 12, a sectional view of parts of the wedging mechanism, showing the guides therefor; Fig. 13, an end view of a part of the wedging mechanism connected with the generator-shaft; Fig. 14, an end view of the socket of a detachable portion of the generator-shaft; Fig. 15, an edge view of one of the wedging parts shown in Fig. 12; Fig. 16, a central sectional view of the pulley and controller, showing modifications in the details thereof; Fig. 17, a central sectional view of the pulley and connecting parts, taken transversely of the axis thereof; Figs. 18, 19, 20, 21, and 22, detached parts of modified form; and Fig. 23, a view similar to Fig. 16, showing other modifications in the details of construction.

Similar reference characters designate corresponding parts throughout the drawings.

In order to readily apply my improvements to various generator-shafts, they are usually constructed on a short shaft complete, which has a socket that may be fitted to an end of the generator-shaft proper, so as to be an extension thereof; but in new generator-work the improvements may be connected directly to the generator-shaft.

A generator which is particularly well adapted to be benefited by the use of my improvements comprises features which will now be described briefly and with which they are advantageously combined. A main base $a$ is adapted to be anchored and support the whole generator mechanism, and preferably it has a cover-plate $a'$, and a movable generator-base $b$ is mounted upon the cover-plate or may be directly upon the main base. A pair of opposing pole-pieces $c\ c$, each having a pair of poles $c'\ c'$ proper, are rigidly secured to the base $b$, and a pair of opposing heads $d\ d'$, having each a journal housing and bearing, are secured rigidly to the pole-pieces. A generator-shaft $e$ is mounted in the bearings of said heads and has a suitable armature $f$ and a commutator $g$, a compound magnet $h$ being connected to the pole-pieces $c\ c$. The shaft $e$ extends outwardly beyond one of its bearings, and my improved pulley $i$ and controller are connected with the extended portion of the shaft. The pulley is designed to be driven by direct peripheral contact with a wheel $j$ of a gas-engine and also may be quickly adapted to be driven by a belt. The base $b$ is connected to the base $a$ by a pivot $k$, and also there is a movable connection at the ends opposite the pivot, the base $a$ having a recess $l$, intersected by bores $m\ m'$. A block $n$ is movable in the recess and is secured to the base $b$ by a bolt $o$, the block having a bore through which a guide-rod $p$ extends, the rod reaching through the bores $m\ m'$ to abutments $q\ q'$. A spring $r$ is seated between the plate $q$ and the block $n$ and provides the cushion for the generator parts and the pulley and controller. The pole-pieces have apertures $x$, into which brush-holders $s\ s'$ are inserted, and circuit-wires $t\ t'$ connect the brush-holders with the binding-posts $u\ u'$, having electrical communication with the igniters through the explosion-chamber $v$ and by means of the cylinder $w$ of the engine.

In carrying out my invention I may employ parts that may be slightly different in different cases, but all operating substantially alike and equally effective in practice, the modifications being rather a matter of taste and convenience.

As preferably constructed, the pulley $i$ is designed to be locked to the generator-shaft by means of its bearings. It may be mounted directly on the shaft $e$ or on a removable extension $e'$ thereof, the latter having a socket 1 and a set-screw 2, whereby to connect it with the main part of the shaft $e$ close to the bearing $y$. For the sake of brevity the extension $e'$ will be hereinafter considered as essentially the generator-shaft, and either it or the shaft proper has a conical bearing-face 3 rigid therewith and a movable bearing-sleeve 4, having a conical bearing-face 5 and a conical wedging face 6, the sleeve working over a spline 7, set into the shaft.

The pulley $i$ has a belt-groove 8 in its rim, so that it may be driven by a circular belt, and in some cases a non-conducting false rim 9, of rubber or the like, is cemented in the groove for making direct contact with the driving wheel or pulley. In the pulley $i$ is a receptacle 10 for containing lubricating oil or grease, which may be inserted through a self-closing valve 11. At the sides of the pulley $i$ are annular beveled bearing-faces 13, in which are oilways 12, communicating with the receptacle 10, and these faces 13 are in contact with the faces 3 and 5, whereon the pulley rotates when driven at high speeds and whereby the shaft may be driven when the pulley moves at low speeds by means of the wedging mechanism of the controller.

In order that the controller may present no projections externally that might be a source of danger to attendants and at the same time be compact and occupy only a limited space on the generator-shaft, the parts are short as measured on the shaft and the movable parts all inclosed, the case providing a guard also for retaining broken parts that might fail in operation. The inclosing case is employed also as part of the functional mechanism coacting with the pulley and is adjustably connected with the generator-shaft, a simple means therefor being screw-threads. The case comprises a disk-like front 14 in connection with the driven shaft and having a flange 15 and preferably a back plate 17 fitted closely in the flange and loosely over the sleeve 4. A binding-nut 18 is fitted on the driven shaft, so as to engage and lock the case to the shaft adjustably. In the case are like wedging blocks 19 20, normally forced elastically toward each other and against the wedge-like conical face 6 of the sleeve 4 by means of opposing springs 21, bearing against the inside face of the flange 15, the blocks having beveled faces 22, adapted to slide against the face 6, and also having suitable guides, such as apertures 23, in which are rods 24 to keep the blocks parallel.

In a slightly-modified form the pulley $i$ has its bearing directly on the generator-shaft adjacent to a disk 25, that is attached to the socket 1, which may be attached to the inner bored end of the part $e'$, into which the shaft $e$ extends, or the socket 1 may directly connect with the shaft $e$. A thin washer 26, of leather or other suitable material, is preferably placed between the pulley and the disk 25 and a similar washer 27 at the opposite side of the pulley. A combined sleeve and disk 28, having a central conical wedge member 29, is placed against the washer 27 and movable on the shaft, but rotating therewith. Blocks 19 and 20 operate, as in the former case, with the wedge member 29 in the case as above described, the blocks being adapted to coact therewith, as in Fig. 16.

In another modified form the pulley $i$, as in Fig. 23, bears on the shaft directly, and a disk 25 and washers 26 and 27 are used, and against the washer 27 is a combined sleeve and disk 30, having a wedge-like conical face 31, covering nearly the whole side of the disk. The same case as before is employed, and in it are wedging blocks 32 and 33, pressed by coiled springs 35, seated in recesses 34, or plate-springs 21 may be used, and any suitable guides for the blocks may be employed. The blocks have suitably-adapted faces 36, operating against the face 31.

It will be obvious that while the "case" which incloses and supports parts of the controller mechanism is described as comprising a front 14 and flange 15, these need not necessarily be continuous, but may be suitably perforated, if desired.

It will be seen from the foregoing that the construction and mode of operation of the controller mechanism are substantially the same in each form described, the pulley-bearings being different and well known in the modifications.

In operation when the driving-wheel begins to rotate the generator will also be driven by means of the pulley $i$, which is locked automatically to the generator-shaft, or practically so, and when the velocity of the generator may have increased to a safe or desirable limit the centrifugal force will cause the wedging blocks to withdraw wholly or partially from contact with the wedge faces of the opposing members, and thus releasing the pressure against the pulley $i$ will permit the latter to rotate more or less freely on its bearing without imparting either any or all of its velocity to the generator-shaft. When the latter has decreased in velocity, the blocks will again operate to bind the pulley to the shaft and drive the generator until it again reaches a safe limit, when the action of the controller will be repeated, and so on. Should it be desired to change the rate of speed of the generator, the controller may be adjusted by means of the screw-threads, the case being moved along its shaft and then fixed thereto. In practice it has been found that while there are occasionally intermittent contacts between the wedging members the action is usually such that the pulley $i$ when at its usual operating speed operates substantially as a loose pulley and by means of its frictional surfaces drives the generator quite uniformly at a rate of speed entirely within the danger limit, the amount of contact being very slight, but sufficient for operating such small low-power machines.

Having thus described my invention, what I claim is—

1. A mechanism including a driving-wheel, a driven wheel operated by means of the driving-wheel, a driven shaft, an inclosing case attached to the driven shaft, and a controller inclosed in the case and operatively connecting the driven wheel with the driven shaft, whereby the driven shaft may be actuated by the driven wheel and its rate of speed limited to a lesser proportional rate of that of the driven wheel.

2. A mechanism including a driving-wheel, a driven wheel operated by means of the driving-wheel, a driven shaft, an inclosing case, wedging members mounted on the shaft and having operative connection with the driven wheel, and wedging-blocks inclosed in the case and adapted to coact with the wedging members, whereby the driven shaft may be actuated and the speed rate thereof limited to a fractional part of the speed to which the driven wheel may attain.

3. A mechanism including a driving-wheel, a driven shaft, a driven wheel, an inclosing case, a wedging member mounted so as to move longitudinally on the driven shaft and operatively connected with the driven wheel, a wedging-block mounted in the inclosing case and having sliding contact with the wedge member, and a spring pressed between the wedging-block and the rim of the inclosing case, whereby the driven shaft may be actuated and its speed limited to a fractional part of the speed of the driven wheel.

4. A mechanism including a driving-wheel, a driven shaft, a driven wheel, a controller comprising a wedging member, a case having a flange extending substantially to the wedging member, wedging-blocks in the case, and springs in the case engaging the wedging-blocks, whereby the driven wheel may impart variable-speed motions to the driven shaft.

5. A mechanism including a driving-wheel, a driven shaft, a driven wheel operated by means of the driving-wheel, a spring operating so as to elastically hold the driven wheel against the periphery of the driven wheel, a wedging member movable on the driven shaft and operatively connecting with the driven wheel, wedging-blocks coacting with the wedging members, springs for the wedging-blocks, and a case inclosing and supporting the wedging-blocks and the springs and attached to the driven shaft, whereby the velocity of the driven shaft may be limited to a predetermined rate relative to the rate of speed of the driven wheel.

6. A speed-limiting means including a driving-wheel, a driven shaft, a driven wheel operated by means of direct contact with the periphery of the driving-wheel and mounted revolubly on the driven shaft, a spring operating to elastically force the driven wheel constantly against the driving-wheel, a conical wedging member operatively connected with the driven wheel, an inclosing case attached to the driven shaft, and controlling mechanism mounted in the case and coacting with the conical wedging member, whereby the driven shaft may be actuated at variable speeds by the driven wheel and the velocity of the driven shaft limited.

7. An electricity-generator comprising a main base, a supplemental base, an armature-shaft, a driven pulley rotative on the armature-shaft, an inclosing case adjustably attached to the armature-shaft and provided with inclosed power-controlled mechanism whereby the driven pulley may be locked to the armature-shaft and speed-controlled means whereby the driven pulley may be released from connection with the armature-shaft, a driving-wheel in contact with the rotative driven pulley, and a cushion for absorbing the thrusts imparted by the driven wheel to the driven pulley.

8. In an electricity-generating machine, a fixed main base, a movable base upon the main base, journal-housings supported by the movable base, a generator-shaft mounted rotatively in said housings, the spring acting against the movable base, a driven wheel mounted rotatively on the generator-shaft, a driving-wheel in constant contact with the driven wheel, and automatically-controlled mechanism whereby the driven wheel is caused to have intermittent operative contact with the generator-shaft, in combination with a gas-engine and circuit-wires connecting the gas-engine with the generating-machine.

9. In an electricity-generating machine, the combination with a driving-wheel and a driven shaft, of a driven wheel rotative on the driven shaft and operated by means of the driving-wheel, a supporting-case adjustably secured to the driven shaft, a controller in the case and coacting therewith and also with the driven wheel, whereby the driven shaft may be actuated and the speed rate thereof limited to a fractional part of the speed to which the driven wheel may attain.

10. In an electricity-generating machine, the combination with a gas-engine having a rotative wheel, of a generator-shaft provided with a sleeve movable longitudinally on the shaft and having a frictional contact-face, a driven wheel mounted rotatively on the generator-shaft and having variably-forced contact with the frictional contact-face of the movable sleeve, and also having constant contact with the rotative wheel of the gas-engine, and means whereby the force of the contact between the movable sleeve and the driven wheel may be automatically graduated.

11. In an electricity-generating machine, the combination with a driving-wheel, a driven wheel having a frictional contact-face, a generator-shaft, means for generating and conducting a current, a gas-engine having a rotative wheel in constant operative connection with the driven wheel, and a controlling mechanism, of a movable connector having a frictional contact-face adapted to engage the contact-face of the driven wheel and partially support the driven wheel in operative connection with the controlling mechanism, whereby the driven wheel may impart variable rates of speed to the generator-shaft.

12. In an electricity-generating machine, means for generating and conducting an electric current, a driven shaft, a driven wheel, a relatively fixed bearing at one side of the driven wheel, a relatively movable bearing at the opposite side of the driven wheel, in combination with an automatically-operated controller coöperating with the movable bearing, whereby the driven wheel may be caused to have intermittent operative connection with the driven shaft, and a driving-wheel having operative connection with the driven wheel.

13. In an electricity-generating machine, the combination with a driving-wheel, of a base, a driven shaft supported by means of the base, a driven wheel rotative on the driven shaft and driven by means of the driving-wheel, a supporting-case adjustably secured to the driven shaft, a controller supported in the case and coacting therewith and also with the driven wheel whereby the driven shaft may be actuated and its velocity limited to a lesser rate than that of the driven wheel, and a cushion interposed operatively between the driving-wheel and the base whereby the thrusts of the driving-wheel against the generating-machine may be absorbed.

14. In an electricity-generating machine, the combination of a main base, journaled housings supported substantially by the base, a generator-shaft mounted rotatively in the housings, a driven wheel having a plurality of friction-faces and mounted rotatively on the generator-shaft, friction members having operative connection with the generator-shaft and also with one of the plurality of friction-faces, automatically-controlled mechanism whereby the friction members may be caused to have intermittent operative contact with the friction-face, whereby the driven wheel may impart variable rates of speed to the generator-shaft, in combination with a gas-engine, having a driving-wheel in operative connection with one of the plurality of friction-faces, and circuit-wires connecting the gas-engine with the generating-machine.

15. In an electricity-generating machine, a driven shaft, an inclosing case attached to the driven shaft, a driven wheel mounted rotatively on the driven shaft, a movable locking device adapted to engage the driven pulley, and controller members operating against the locking device and also within the case and against the front and the flange or rim thereof, in combination with means for generating and conducting an electric current, and a gas-engine having a rotative wheel in operative connection with the driven wheel.

16. In an electricity-generating machine, the combination of a driven shaft, a driven wheel rotative on the driven shaft, means connected with the driven shaft whereby electricity may be generated, a sleeve mounted so as to move longitudinally on the driven shaft and having a friction-face in operative connection with the driven wheel, means whereby the sleeve may be automatically moved to and from the driven wheel and having a supporting member adjustably secured to the driven shaft, whereby the driven wheel may impart variable-speed motions to the driven shaft, in combination with a gas-engine, circuit-wires connecting the gas-engine with the generating-machine, and a driving-wheel connected operatively to the driven wheel.

17. In an electricity-generating machine, the combination of a driving-wheel, a driven shaft, a driven wheel rotative on the driven shaft and having an elastic rim in contact with the periphery of the driving-wheel, a sleeve movable longitudinally on the driven shaft and rotatively therewith and having a friction-face in operative connection with the driven wheel, a supporting member secured to the driven shaft, automatically-operated means carried by the supporting member and operatively connected with the sleeve, whereby the driven shaft may be actuated by the driven wheel and the thrusts thereof absorbed, and the velocity of the driven shaft limited to a predetermined rate relative to the peripheral speed of the driving-wheel, with a gas-engine actuating the driven wheel, and circuit-wires connecting the gas-engine with the generating-machine.

18. In an electricity-generating machine, a driving-wheel, a driven shaft, a driven wheel rotative on the driven shaft and having the periphery thereof in contact with the periphery of the driving-wheel, a supporting member secured to the driven shaft, and movable members having frictional contact-faces normally connecting the driven wheel to the supporting member whereby the driven wheel may actuate the driven shaft and whereby the driven wheel may be disconnected from the driven shaft, in combination with a gas-engine actuating the driving-wheel, and circuit-wires connecting the gas-engine with the generating-machine.

19. In an electricity-generating machine, the combination of a driven shaft, means for generating electricity connected with the driven shaft, a driven wheel rotative on the driven shaft and having a frictional contact-face, a controlling mechanism, and a movable connector having a frictional contact-face adapted to engage the contact-face of the driven wheel in operative connection with the controlling mechanism, whereby the driven wheel may impart variable rates of speed to the driven shaft, with a gas-engine, a driving-wheel actuated by the gas-engine and connected with the driven wheel, and circuit-wires connecting the gas-engine with the means for generating electricity.

20. In an electricity-generating machine, the combination of the main base, the generator-shaft, the generator connected with the generator-shaft, the driven wheel rotative on the generator-shaft, the groove in the periphery of said wheel, the supporting member secured to the generator-shaft, and the controller mechanism operatively connecting the supporting member with said driven wheel, with the gas-engine, the driving-wheel operatively connected with said driven wheel, and the circuit-wires connecting the gas-engine with the generator.

21. In an electricity-generating machine, the combination of the generator-shaft, the generator connected with said shaft, the supplemental extension-shaft having the socket connected detachably to said generator-shaft, the driven wheel rotative on said extension-shaft, the supporting member secured to said extension-shaft, the movable connector and the controller connected with the supporting member and adapted to actuate the movable connector, with the gas-engine, the driving-wheel actuating the driven wheel, and the circuit-wires connecting the gas-engine with the generator.

In testimony whereof I affix my signature in presence of two witnesses.

GARRETT W. HENRICKS.

Witnesses:
   HARRY D. PIERSON,
   E. T. SILVIUS.